Sept. 23, 1952     D. J. REYNOLDS     2,611,473
REMOVABLE CARRIER TRAY FOR GEAR HARDENING APPARATUS
Filed June 23, 1949     2 SHEETS—SHEET 2
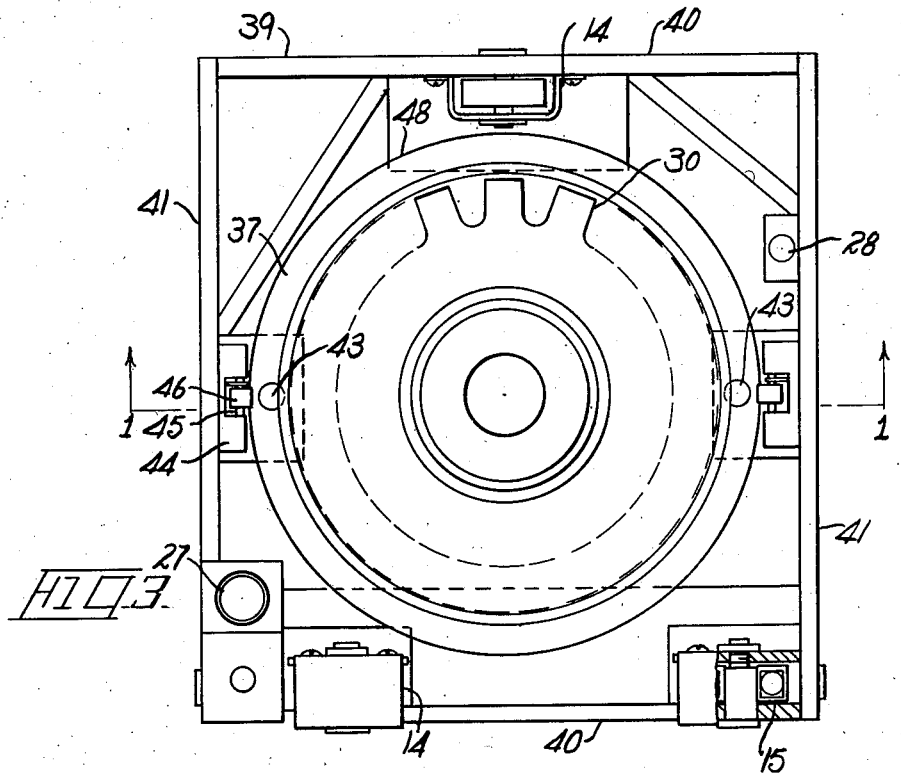
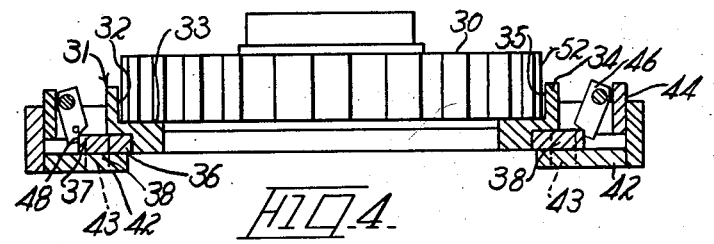
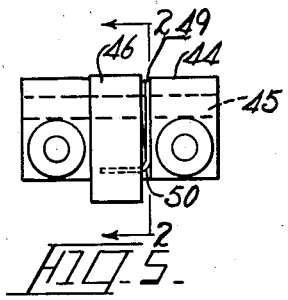
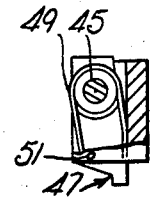
Inventor
Delos J. Reynolds
Paul O. Pinpel
Atty Patented Sept. 23, 1952

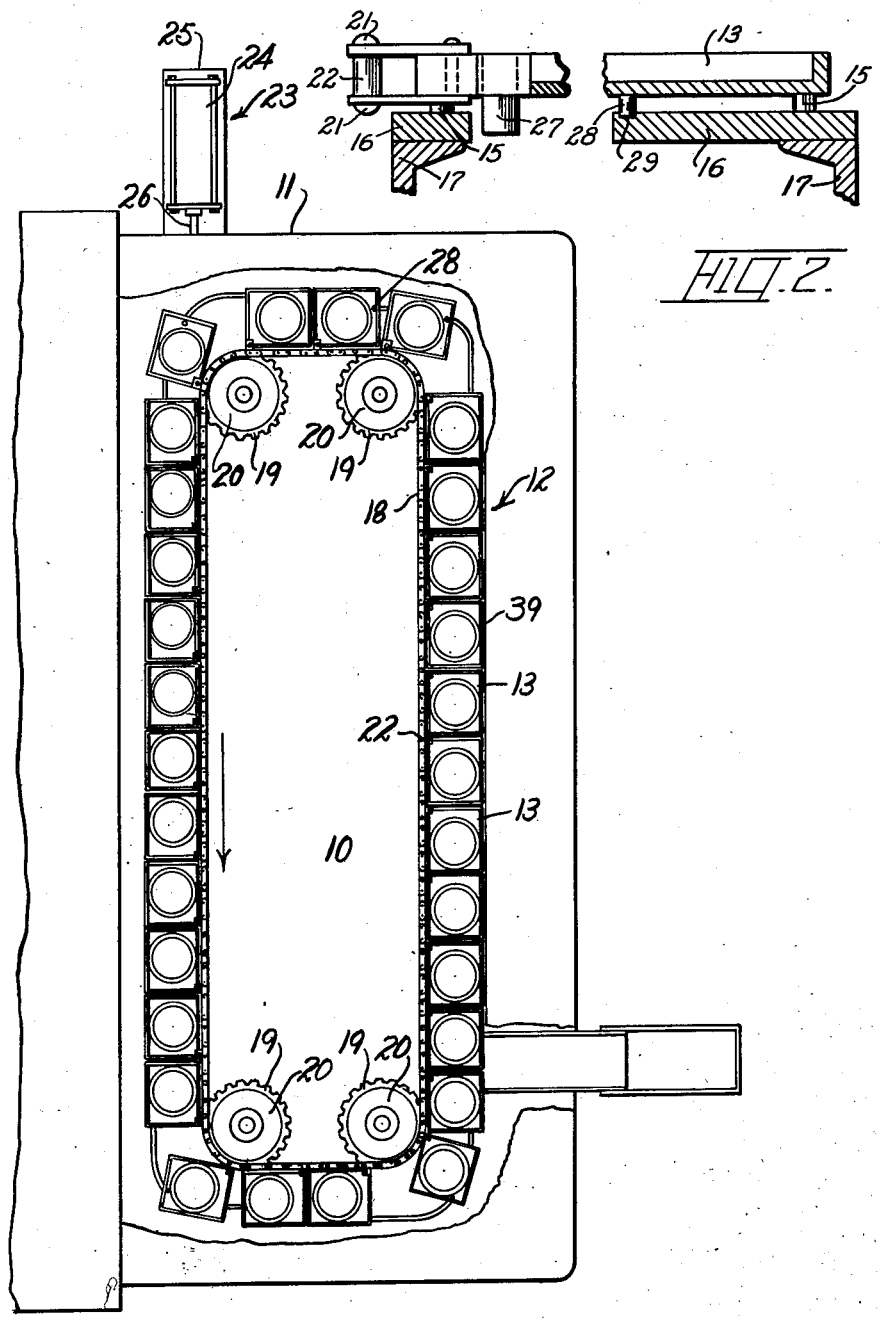

2,611,473

UNITED STATES PATENT OFFICE 2,611,473

REMOVABLE CARRIER TRAY FOR GEAR HARDENING APPARATUS

Delos J. Reynolds, Chicago, Ill., assignor of one-half to International Harvester Company, Chicago, Ill., a corporation of New Jersey, and one-half to Westinghouse Electric Corporation, Pittsburgh, Pa., a corporation of Pennsylvania Application June 23, 1949, Serial No. 100,909

2 Claims. (Cl. 198—131)

This invention relates to an improved material handling device. More particularly, it relates to a new and improved tray for supporting irregular shaped articles such as gears to a plurality of heat treating stations.

The principal objective of this invention sought to be accomplished is the provision of a novel tray which is particularly advantageous to use in the apparatus disclosed in the H. F. Kincaid et al. application Ser. No. 48,296 entitled "Electronic Heat Treating Device" filed September 8, 1948, assigned to the same assignees of the present invention. Briefly stated, the device disclosed therein heat treats metallic articles having irregular contours such as gears, racks and sprockets by the induction method to secure an efficient article having a surface zone hardened to a predetermined hardness. An endless conveyor is provided which delivers the article to be treated adjacent a plurality of work or heat treating stations in a sequential manner where various hardening operations are accomplished. The apparatus is particularly suitable for the production of hardened objects of one specific size at a high rate and low cost to satisfy the demands of modern mass production. Inasmuch as a great volume of articles of one particular size must be needed to make the device economical to operate and an occasion may arise where articles of different sizes are to be supplied continuously or certain operations involve so few articles of one size that setting up of the apparatus is unwarranted, it is the prime object of this invention to provide a tray capable of accommodating articles having different sizes whereby various sized articles may be treated on the same conveyor at the same time.

In this invention numerous article supporting means are supplied which are each capable of supporting and centering a different size article, but are each adaptable to be mounted on any one tray frame. Furthermore, the article supporting and centering means may be readily and quickly removed and replaced by another of a different size.

Another object is the provision of a simple and efficient structure for mounting the article supporting member on the tray frame.

A further object is to provide a novel locking device mounted on the tray frame for preventing removal or vertical displacement of the article supporting means from the frame but which may be easily released to allow removal of the supporting means.

The foregoing and other important objects and desirable features inherent in and encompassed by the invention together with many of the purposes and uses thereof will become readily apparent from a reading of the ensuing description in conjunction with the annexed drawings.

Fig. 1 is a plan view of the endless conveyor mounted on the heat treating device.

Fig. 2 is a side elevational view showing the endless track in cross section.

Fig. 3 is a plan view of one of the endless conveyor trays.

Fig. 4 is a side elevational view taken substantially along line 1—1 of Fig. 3.

Fig. 5 is a side elevational view in detail of the spring pressed pawl.

Fig. 6 is a cross sectional view taken along line 2—2 of Fig. 5.

Referring to the drawings in which like reference characters refer to like elements or features throughout the various views, a conveyor mechanism 10 is positioned on an induction heat treating machine 11 partially shown in Fig. 1. The conveyor mechanism 10 generally comprises an endless conveyor 12 of the tray type which includes a plurality of inter-connected trays 13 for delivering the articles to be heat treated in successive alignment with a plurality of longitudinally spaced heat treating or work stations (not shown). Each tray is provided with a plurality of splash guards 14 for preventing foreign articles from hindering rotation of track wheels 15 which are movable upon endless tracks 16 and journaled in side walls 40. The endless tracks 16 provide a rectangularly shaped track and are supported on horizontally extending channel beams 17 partially shown suitably secured to the heat treating machine 11.

The trays 13 are interconnected for co-joint movement by being pivotally attached to an endless chain 18 which is trained around sprockets 19 two of which are provided at each end of the conveyor mechanism 10. The sprockets 19 are rotatably mounted on vertical shafts 20. The trays 13 are attached to the chain 18 by means of a pair of outwardly projecting legs 21 secured to and extending from a chain link adjacent each tray adapted to straddle one corner of the tray and be secured thereto by a pin 22 passing through aligned apertures in said legs 21 and in the corner of the tray 13.

The endless conveyor 12 is movable in the direction of the arrow shown in Fig. 1 and is actuated by means of an indexing mechanism 23. The indexing mechanism 23, which will only be described briefly since it forms no part of the present invention, comprises a pneumatic cylinder 24 supported on a table 25 attached to one end of the heat treating machine 11. A piston rod 26, partially shown, projects from the cylinder 24 and is adapted for reciprocating movement. It will be noted that each tray 13 has a downwardly projecting dowel pin 27 which is contacted by the piston rod 26 for moving the trays 13 upon reciprocation of the piston rod 26. Furthermore, each tray 13 has a second downwardly projecting pin 28 which extends into a groove 29 formed in one of the endless tracks 16 to guide the tray during its movement around and the corners of the rectangular path by limiting and controlling the pivotal motion of the trays as they swing around the corners.

As best shown in Figs. 3 and 4, the article 30 to be heat treated (a gear is shown) is supported on a circular plate 31. The plate 31 has a counterbored portion 32 to provide an internal annular shoulder 33 and a vertical extending wall portion 34. The article 30 is supported on the shoulder 33 and the internal wall 35 of the portion 34 abuts the outer periphery 52 of the gear and serves to center and prevent horizontal displacement of the gear with respect to the plate 31. It is to be understood that for gears or articles of different sizes from that shown in Figs. 3 and 4 the diameter of the counterbored portion 32 would have to be varied to accommodate the other sizes to properly support and center the article. Press fit or otherwise suitably secured to a lower portion of plate 31 is a circular ring member 36, a portion 37 of which projects radially outwardly. The projecting portion 37 has a pair of diametrically disposed apertures 38 therethrough for a purpose which will be explained hereinafter.

Each tray 13 comprises a substantially rectangular frame designated generally by the numeral 39. Frame 39 has a first pair of oppositely disposed vertical side walls 40 and a second pair 41 are rigidly secured together by welding. Projecting from a lowermost portion of side walls 41 midway between their ends is an inwardly extending lug 42 adapted to form a seat for the circular ring member 36 as shown in Fig. 4. A vertical pin 43 projects from each lug 42. When the circular ring member 36 is supported on the lugs 42 the pin 43 will extend into apertures 38, thus locating the article with respect to the frame and also preventing horizontal movement of the circular ring member 36 with respect to the frame. It will be appreciated that the diametrical distance between the two apertures will be the same on all of the circular ring members regardless of the size of the article carried by the circular plate 31.

Inasmuch as the circular plate 31 may be displaced vertically during the various work or heat treating operations by vertical forces acting upon it, a structure is provided to overcome this difficulty by maintaining the circular ring member 36 on the lugs 42 but allowing the plate 31 to be easily removed if so desired by rendering the structure non-operative. Secured to each of the side walls 41 adjacent the lug 42 is a bracket 44. A pin 45 is supported on the bracket 44 and has a pawl 46 journaled thereon. Each pawl 46 has a notched portion 47 at one end which engages the outer peripheral edge 48 of the circular ring member 36 in one position to prevent removal of the ring member 36 from the supporting lugs 42. A helical spring 49 surrounds a portion of the pin 45 and has a portion 50 confined in a small aperture 51 in the pawl 46. The spring 49 continu- ally urges the pawl inwardly or toward the center of the tray, causing the notch portion to abut the circular ring member 36. However, should it be desired to remove the article supporting structure, the pawls may be pivoted away from the circular ring member 36 causing spring 49 to wind up to a tensional state and removal is thus easily affected.

The embodiment of the invention chosen for the purpose of illustration and description herein is that preferred in view of the requirements for achieving the objects of the invention and developing the utility thereof in the most desirable manner, due regard being had to existing factors of economy, simplicity of design and construction, and the improvement sought to be effected. It will be appreciated therefore that the particular structural and functional aspects emphasized herein are not intended to exclude, but rather to suggest, such other additions and modifications of the invention as fall within the spirit and scope of the invention as defined in the appended claims.

What is claimed is:

1. In an endless conveyor for movably supporting articles to a plurality of work stations, the combination comprising a plurality of trays inter-connected for conjoint movement whereby each tray is moved successively from one work position to another, each tray including a rectangular frame having a first and second pair of oppositely disposed side walls; means for supporting each tray for movement including a plurality of track wheels rotatably mounted on said first pair of side walls adapted to bear on an endless track; means to guide said trays including a pin projecting downwardly from one of said side walls adapted to extend into a groove in said endless track; means to support and center the article including a circular plate having a centrally located counterbored portion to form an annular shoulder to support the article and a vertical extending wall portion abutting the outer peripheral surface to prevent horizontal displacement of the article relative to said frame, and a circular ring member concentric with and attached to said circular plate, said circular ring member having a portion projecting radially outwardly and having a pair of diametrically disposed apertures therethrough; means for mounting said article supporting and centering means on said frame comprising an inwardly extending lug projecting from each of said second pair of side walls adapted to form a seat for said circular ring member, said lugs each having a vertical pin projecting therefrom adapted to extend into said apertures; means to prevent removal of said supporting and centering means from said frame in a first position and to allow removal in a second position comprising a pawl pivotally mounted on each of said second pair of side walls adjacent said lugs having a notch at one end adapted to abut said radially projecting portion of said circular ring member in said first position and to pivot away from said circular ring member in said second position, and a spring urging each pawl to said first position.

2. In an endless conveyor for movably supporting articles to a plurality of work stations, the combination comprising a plurality of trays inter-connected for conjoint movement whereby each tray is moved successively from one work station to another, each tray comprising a rectangular frame having a pair of oppositely disposed side walls; means for supporting each tray for movement; means to guide said trays; means to support and center the article including a circular plate having a centrally located counterbored portion to form an annular shoulder to support the article and a vertical wall portion adapted to abut the outer peripheral surface of the article to prevent horizontal displacement of the article relative to said frame, and a circular ring member concentric with and attached to said circular plate, said circular ring member having a portion projecting radially outwardly and having a pair of diametrically disposed apertures therethrough; means for mounting said article supporting and centering means on said frame comprising an inwardly projecting portion of each of said sidewalls adapted to form a seat for said circular ring member, said inwardly projecting portions each having a vertical pin projecting therefrom adapted to extend into said apertures; means to prevent removal of said supporting and centering means from said frame in a first position and to allow removal in a second position comprising a pawl pivotally mounted on each of said side walls adjacent said lugs adapted to abut said radially projecting portion of said circular ring member in said first position and to pivot away from said circular ring member in said second position, and a spring urging each pawl to said first position.

DELOS J. REYNOLDS.

REFERENCES CITED

The following references are of record in the file of this patent:

UNITED STATES PATENTS

| Number | Name | Date |
|---|---|---|
| 756,272 | Noble | Apr. 5, 1904 |
| 815,707 | Hutchison | Mar. 20, 1906 |
| 818,927 | Waite | Apr. 24, 1906 |
| 2,163,351 | Paul | June 20, 1939 |
| 2,340,972 | Matthews | Feb. 8, 1944 |
| 2,432,137 | Burke | Dec. 9, 1947 |